US012803771B2

(12) United States Patent
Dalmia

(10) Patent No.: US 12,803,771 B2
(45) Date of Patent: Nov. 17, 2026

(54) TIME DOMAIN DUPLEXING ETHERNET PHY

(71) Applicant: NXP USA, Inc., Austin, TX (US)

(72) Inventor: Kamal Dalmia, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 664 days.

(21) Appl. No.: 17/960,684

(22) Filed: Oct. 5, 2022

(65) Prior Publication Data

US 2023/0136444 A1 May 4, 2023

Related U.S. Application Data

(60) Provisional application No. 63/398,169, filed on Aug. 15, 2022, provisional application No. 63/293,572, filed on Dec. 23, 2021, provisional application No. 63/253,044, filed on Oct. 6, 2021.

(51) Int. Cl.
*H04L 5/14* (2006.01)
*H04L 1/00* (2006.01)
*H04L 25/49* (2006.01)

(52) U.S. Cl.
CPC .......... *H04L 5/1469* (2013.01); *H04L 1/0057* (2013.01); *H04L 25/4917* (2013.01)

(58) Field of Classification Search
None
See application file for complete search history.

(56) References Cited

U.S. PATENT DOCUMENTS 6,795,450 B1 * 9/2004 Mills .................... H04L 12/12 713/300
8,089,906 B2 * 1/2012 Poulin .................... H04L 5/143 370/280
10,439,761 B1 * 10/2019 Pandey ................ H04L 1/0025
10,594,524 B1 * 3/2020 Sedarat ............ H04L 25/03343
10,892,880 B1 1/2021 Dalmia
11,038,607 B2 6/2021 Dalmia
11,296,858 B2 * 4/2022 Den Besten ...... H04L 12/40156
11,552,776 B1 * 1/2023 Sedarat ................ H04L 12/413
12,375,329 B2 * 7/2025 Cai .................. H04L 12/40136
2007/0081475 A1 * 4/2007 Telado .................... H04L 1/007 370/255
2009/0010318 A1 * 1/2009 Belogolovyi ....... H04L 25/4917 375/222
2009/0304022 A1 * 12/2009 Yang .................. H04L 49/9063 370/463
2015/0067435 A1 * 3/2015 Yerramalli ............ H04L 1/0071 714/748

(Continued)

*Primary Examiner* — Jamie J Atala

(57) ABSTRACT

The proposed communication protocol enables both asymmetrical and symmetrical communication using TDD based allocation system, while having Ethernet PHY compatibility for interface with other systems. Ethernet physical layer device is configured to process data from a MAC to a desired line rate and is configured with a a XGMII interface configured to transport data from the MAC. An encoder is configured to perform encoding on the data received over the XGMII interface to create encoded data. A burst mapper is configured to append OAM or reserved bit allocation to the encoded data to create mapped data and a PCS device configured process the mapped data to data burst that include a header and one or phy blocks of data.

22 Claims, 11 Drawing Sheets

(56) References Cited

U.S. PATENT DOCUMENTS

| | | | | |
|---|---|---|---|---|
| 2016/0365967 | A1* | 12/2016 | Tu | H04L 12/413 |
| 2018/0098076 | A1* | 4/2018 | Su | H04J 3/07 |
| 2019/0081881 | A1 | 3/2019 | Ranjal | |
| 2019/0312716 | A1* | 10/2019 | Maes | H04L 5/1469 |
| 2020/0092171 | A1 | 3/2020 | Ramakrishnan | |
| 2020/0177522 | A1* | 6/2020 | Lo | H04L 49/20 |
| 2020/0412586 | A1 | 12/2020 | McLoughlin | |
| 2021/0014091 | A1* | 1/2021 | Greiss | H03M 7/04 |
| 2021/0235325 | A1 | 7/2021 | Desai | |
| 2021/0344561 | A1 | 11/2021 | Seewald | |

* cited by examiner

ASA - TDD based Device (Prior Art)

Ethernet Device (Prior Art)

| | Dn payload rate | Up payload rate |
|---|---|---|
| ASYM | 10G | 1G |
| | 10G | 100M |
| | 5G | 100M |
| | 2.5G | 100M |
| SYM | 5G | 5G |
| | 2.5G | 2.5G |
| | 1G | 1G |

PCS structure 64b/65b coding

| | Dn Line Speed (PMA rate) | FEC blocks | FEC Bytes per Block | Rsv | Rsv | PHY Level OAM | PHY Payload | Total Bytes per Block | Total PHY frame Size | Up Line Speed | FEC blocks | FEC Bytes per Block | Rsv | Rsv | PHY Level OAM | PHY Payload | Total Bytes per Block | Total PHY frame Size |
|---|---|---|---|---|---|---|---|---|---|---|---|---|---|---|---|---|---|---|
| | (Gbps) | | (bytes) | (bytes) | (bytes) | (bytes) | (bytes) | (bytes) | (bytes) | (Gbps) | | (bytes) | (bytes) | (bytes) | (bytes) | (bytes) | (bytes) | (bytes) |
| | | | | 22 bits | | | | | | | | | 22 bits | | | | | |
| Sym | 4 | 1 | 26 | 1 | 1 | 0.75 | 211.25 | 214 | 240 | 4 | 1 | 26 | 1 | 1 | 0.75 | 211.25 | 214 | 240 |
| | 8 | 1 | 26 | 1 | 1 | 0.75 | 211.25 | 214 | 240 | 8 | 1 | 26 | 1 | 1 | 0.75 | 211.25 | 214 | 240 |
| | 16 | 1 | 26 | 1 | 1 | 0.75 | 211.25 | 214 | 240 | 16 | 1 | 26 | 1 | 1 | 0.75 | 211.25 | 214 | 240 |
| Asym | 4 | 1 | 26 | 1 | 1 | 0.75 | 211.25 | 214 | 240 | 4 | 1 | 26 | 1 | 1 | 0.75 | 211.25 | 214 | 240 |
| | 8 | 1 | 26 | 1 | 1 | 0.75 | 211.25 | 214 | 240 | 8 | 1 | 26 | 1 | 1 | 0.75 | 211.25 | 214 | 240 |
| | 16 | 1 | 26 | 1 | 1 | 0.75 | 211.25 | 214 | 240 | 16 | 1 | 26 | 1 | 1 | 0.75 | 211.25 | 214 | 240 |
| | 16 | 1 | 26 | 1 | 1 | 0.75 | 211.25 | 214 | 240 | 16 | 1 | 26 | 1 | 1 | 0.75 | 211.25 | 214 | 240 |
| 804 | 808 | 810 | | 812 | | | 816 | 820 | 824 | 828 | 832 | | 836 | | | 840 | 844 | 848 |

| Dn Burst count | Dn Burst time | Up Burst count | Up Burst time | IBG + Resync | TDD Cycle | Down-stream 64b data Rate | Up-stream 64b data Rate | Down-stream Burst Rate without OAM | Up-stream Burst Rate without OAM | |
|---|---|---|---|---|---|---|---|---|---|---|
| (blocks) | (us) | (blocks) | (us) | (us) | (us) | (Gbps) | (Gbps) | (Gbps) | (Gbps) | |
| 2 | 0.96 | 2 | 0.96 | 0.296 | 2.512 | 1.325 | 1.325 | 1.3455 | 1.35 | 1G-1G |
| 4 | 0.96 | 4 | 0.96 | 0.296 | 2.512 | 2.650 | 2.650 | 2.6911 | 2.69 | 2.5G 2.5G |
| 8 | 0.96 | 8 | 0.96 | 0.296 | 2.512 | 5.299 | 5.299 | 5.3822 | 5.38 | 5G 5G |
| 6 | 2.88 | 1 | 0.48 | 0.296 | 3.952 | 2.526 | 0.421 | 2.5658 | 0.43 | 2.5G 100M |
| 12 | 2.88 | 1 | 0.48 | 0.296 | 3.952 | 5.053 | 0.421 | 5.1316 | 0.43 | 5G 100M |
| 24 | 2.88 | 1 | 0.48 | 0.296 | 3.952 | 10.105 | 0.421 | 10.2632 | 0.43 | 10G 100M |
| 24 | 2.88 | 4 | 0.48 | 0.296 | 3.952 | 10.105 | 1.684 | 10.2632 | 1.71 | 10G 1G |
| | | | | | | 64b | 64b | 65b | 65b | |
| 852 | 856 | 858 | 860 | | | 862 | 864 | 866 | 868 | 890 |

FIG. 8

Alternate embodiment using 64b/66b coding

| | Dn Line Speed (Gbps) | FEC blocks | FEC Bytes per Block (bytes) | MUX header (bytes) | Rsv & Counter (bytes) | PHY Level OAM (bytes) | PHY Payload (bytes) | Total Bytes per Block (bytes) | Total PHY frame Size (bytes) | Up Line Speed (Gbps) | FEC blocks | FEC Bytes per Block (bytes) | MUX header (bytes) | Rsv (bytes) | PHY Level OAM (bytes) | PHY Payload (bytes) | Total Bytes per Block (bytes) | Total PHY frame Size (bytes) |
|---|---|---|---|---|---|---|---|---|---|---|---|---|---|---|---|---|---|---|
| Sym | 4 | 1 | 26 | 3 | 4 | 0.75 | 206.25 | 214 | 240 | 4 | 1 | 26 | 3 | 4 | 0.75 | 206.25 | 214 | 240 |
| | 8 | 1 | 26 | 3 | 4 | 0.75 | 206.25 | 214 | 240 | 8 | 1 | 26 | 3 | 4 | 0.75 | 206.25 | 214 | 240 |
| | 16 | 1 | 26 | 3 | 4 | 0.75 | 206.25 | 214 | 240 | 16 | 1 | 26 | 3 | 4 | 0.75 | 206.25 | 214 | 240 |
| Asym | 4 | 1 | 26 | 3 | 4 | 0.75 | 206.25 | 214 | 240 | 4 | 1 | 26 | 3 | 4 | 0.75 | 206.25 | 214 | 240 |
| | 8 | 1 | 26 | 3 | 4 | 0.75 | 206.25 | 214 | 240 | 4 | 1 | 26 | 3 | 4 | 0.75 | 206.25 | 214 | 240 |
| | 16 | 1 | 26 | 3 | 4 | 0.75 | 206.25 | 214 | 240 | 4 | 1 | 26 | 3 | 4 | 0.75 | 206.25 | 214 | 240 |
| | 16 | 1 | 26 | 3 | 4 | 0.75 | 206.25 | 214 | 240 | 16 | 1 | 26 | 3 | 4 | 0.75 | 206.25 | 214 | 240 |

62 bits 62 bits 908 912 916 920

| Dn Burst count (blocks) | Dn Burst time (us) | Up Burst count (blocks) | Up Burst time (us) | IBG + Resync (us) | TDD Cycle (us) | Down-stream 64b data Rate (Gbps) | Up-stream 64b data Rate (Gbps) | Down-stream Burst Rate without OAM (Gbps) | Up-stream Burst Rate without OAM (Gbps) | |
|---|---|---|---|---|---|---|---|---|---|---|
| 2 | 0.96 | 2 | 0.96 | 0.296 | 2.512 | 1.325 | 1.325 | 1.3455 | 1.35 | 1G-1G |
| 4 | 0.96 | 4 | 0.96 | 0.296 | 2.512 | 2.650 | 2.650 | 2.6911 | 2.69 | 2.5G 2.5G |
| 8 | 0.96 | 8 | 0.96 | 0.296 | 2.512 | 5.299 | 5.299 | 5.3822 | 5.38 | 5G 5G |
| 7 | 3.36 | 1 | 0.48 | 0.296 | 3.952 | 2.526 | 0.421 | 2.5658 | 0.43 | 2.5G 100M |
| 14 | 3.36 | 1 | 0.48 | 0.296 | 3.952 | 5.053 | 0.421 | 5.1316 | 0.43 | 5G 100M |
| 28 | 3.36 | 1 | 0.48 | 0.296 | 3.952 | 10.105 | 0.421 | 10.2632 | 0.43 | 10G 100M |
| 28 | 3.36 | 4 | 0.48 | 0.296 | 3.952 | 10.105 | 1.684 | 10.2632 | 1.71 | 10G 1G |

64b 64b 65b 65b 924 928 932 936 940 944

FIG. 9

Various Embodiments

| Up-stream Equ 64 bit payload BW | Up-stream 66 bit payload BW | Down-stream Equ 64 bit payload BW | Downstream 66 bit payload BW | | Down Stream timing: Line Symbol Rate (Gsym/Sec) | Bits/symbol | Line Bit rate (Gbps) | Resync symbols | PhyL Blocks | Bytes per Block | Bytes per Cycle | Bytes per Cycle with OAM | Break into 66 b chunks | Round down | Prelim Payload bits |
|---|---|---|---|---|---|---|---|---|---|---|---|---|---|---|---|
| 56.37 | 58.131 | 10.00000 | 10.31250000 | 10G Eth | 6 | 2 | 12 | 1152 | 57 | 642 | 36,594 | 292,752 | 4,435.6 | 4,435.0 | 292,710 |
| 424.64 | 437.91 | 10.00458 | 10.31722125 | 10G Eth | 8 | 2 | 16 | 1536 | 8 | 642 | 5,136 | 41,088 | 622.545 | 622.0 | 41,052 |
| 424.18 | 437.43 | 5.00530 | 5.16171792 | 5G Eth | 8 | 2 | 8 | 1536 | 4 | 642 | 2,568 | 20,544 | 311.273 | 311.0 | 20,526 |
| 535.30 | 552.02 | 2.50519 | 2.58347273 | 2.5G Eth | 4 | 1 | 4 | 768 | 2 | 642 | 1,284 | 10,272 | 155.636 | 155.0 | 10,230 |

| Prelim OAM-bits | Extra OAM chunks | Total OAM bits | Final Payload | Number of 66b payload chunks | FEC Bytes per Block | Total Payload + FEC + OAM Bytes per Block | Resync time per cycle (us) | 66b Payload time per cycle (us) | OAM time (us) | FEC time per cycle (us) | 66b Payload + OAM + FEC (us)+OAM | IBG (us) | Total Down-stream time (us) |
|---|---|---|---|---|---|---|---|---|---|---|---|---|---|
| 42 | - | 42 | 292,710 | 4,435.0 | 78 | 720 | 0.192 | 24.393 | 0.0035 | 2.964 | 27.36 | 0.104 | 27.66 |
| 36 | 33 | 2,214 | 38,874 | 589.0 | 78 | 720 | 0.192 | 2.430 | 0.00225 | 0.312 | 2.74 | 0.104 | 3.04 |
| 18 | 16 | 1,074 | 19,470 | 295.0 | 78 | 720 | 0.192 | 2.434 | 0.00225 | 0.312 | 2.75 | 0.104 | 3.04 |
| 42 | 38 | 2,550 | 7,722 | 117.0 | 78 | 648 | 0.192 | 1.931 | 0.0105 | 0.024 | 1.97 | 0.104 | 2.26 |

FIG. 11

TIME DOMAIN DUPLEXING ETHERNET PHY

1. FIELD OF THE INVENTION

The innovation relates to data communication protocols, and in particular to bit mapping between difference protocols.

2. RELATED ART

Data communication is ubiquitous in modern day life. As automobiles include more technology, there is also a need for data communication within automobiles. By way of example and not limitation, modern automobiles have numerous cameras, such a rear facing and front facing cameras. In addition, many cars have additional sensors and/or cameras that enable self-driving capabilities. The data from these cameras and sensors are typically provided to a processor for processing or display.

At the core of these capabilities, is the data communication network. There are several prior art network protocols and designs, but all have certain drawbacks. One prior protocol proposed by ASA (automotive SerDes Alliance) is shown generally in FIG. 1. ASA created a specification for asymmetrical time domain duplexing (TDD) base PHY. This specification is referred to as ASA 1.0. As shown a data link layer (DLL) 104 along with an operation, administration, and management protocol exchanges data with the ASA physical coding sublayer (PCS) 108, which is TDD based. The ASA physical coding sublayer (PCS) 108 communicates with the physical medium attachment (PMA) sublayer 112 as shown.

While this configuration enabled data communication, it is limited to asymmetrical operation, such that communication in the downstream direction is at a different data rate than the upstream rate. Thus, it did not provide for symmetric data rates. Moreover, it was newly released and unfamiliar to many.

Another proposed solution is shown in FIG. 2. This system relates closely to the well-known Ethernet protocol which was written for automotive applications. This specification defines a PHY that incorporates echo cancellation with only symmetrical communication. This specification includes an LPI client 204 and medium access control (MAC) layer 208 both of which connect to a reconciliation (RS) layer 212. The reconciliation (RS) layer 212 communicates over a prior art xMII interface with an Ethernet PCS 216, which is configured as a non-TDD device, but includes echo cancellation. The Ethernet PCS 216 communicates with the physical medium attachment (PMA) sublayer 112 as shown.

While this configuration enabled data communication, it is limited to symmetrical operation such that communication in the downstream direction can only occur at the same data rate as the upstream rate. Thus, it did not provide for asymmetric data rates. As a result, it lacks flexibility to tailor the data rates in each direction. This is particularly problematic because in automotive application, the amount of data to be sent from the camera (sensor) to the processor is much greater than the amount of data that is sent from the processor to the camera. Ethernet comes from a older legacy design and less able to adapt to new needs in specific applications.

Therefore, there are drawbacks to existing systems available for use in automotive applications. Due to the nature of automotive applications and the risks associated with automobiles, having the optimal data communications systems is of great importance.

SUMMARY

To overcome the drawbacks in the prior art and provide additional benefits, disclosed is an improved communication protocol offering TDD functionality with symmetrical and asymmetrical data rates, while including the well-known and established interface capability of the Ethernet protocol.

In one embodiment, disclosed is a physical layer Ethernet device, utilizing time domain duplexing, capable of symmetrical or asymmetrical communication. In one embodiment, the devices include a time domain duplexing PCS comprising a XGMII encoder configured to receive first data, over an XGMII interface, and encode the first data to create second data using XGMII encoding. A burst mapper is configured to receive the second data and generate mapped data, such that the mapped data comprises blocks of data, OAM data, and reserved bits. A framer is configured to process the mapped data with Reed Solomon FEC framing and perform scrambling to create data bursts, that include a header and one or more phyL blocks. A mapping module is also part of this device and is configured to perform pulse amplitude mapping on the data bursts to create mapped signals. A PMA configured to transmit and receive the PAM4 signals and the PAM2 signals over a channel, ranging from 2 Gbps to 16 Gbps.

In one embodiment, the first data comprises 64 bits of payload and 4 bits of control per 32 bits of payload. The XGMII encoding may comprises 64b/65b encoding or 64B/66b encoding. The mapped data may comprise 26 blocks of data, each having 65 bits along with 22 bits for OAM and reserved bits. It is contemplated that the mapped signal may comprise PAM2 signal, PAM4 signals, or both, such that 12 Gbps and 16 Gbps signals are transmitted as PAM4 signals and 8 Gbps and lower signal are transmitted as PAM2 signals. In one embodiment, each phyL block comprises 240 bytes. The device may further comprise incorporating idle symbols, prior to burst mapping, to reduce the effective data rate. In one configuration, the data rates in asymmetrical mode comprise: 2.5 Gbps and 100 Mbps, 5 Gbps and 100 Mbps, 10 Gbps and 100 Mbps, and 10 Gbps and 1 Gbps.

Also disclosed herein method, utilizing time domain duplexing, capable of symmetrical or asymmetrical communication, performed by a physical layer device, comprising performing XGMII encoding on first data, received over an XGMII interface, wherein the first data comprises 64 bits of payload and 4 bits of control per 32 bits of payload, to create second data. Then, mapping the second data with a burst mapper to generate mapped data, and thereafter, framing the mapped data with Reed Solomon FEC framing and performing scrambling to create data bursts. The data bursts including a header and one or more phyL blocks. This method of operation also performs PAM2/PAM4 mapping on the data bursts to create PAM4 signals and PAM2 signals. Transmitting and receiving the PAM4 signals and the PAM2 signals, also occurs, where there signals range from 2 Gbps to 16 Gbps, such that 12 Gbps and 16 Gbps signals are transmitted as PAM4 signals and 8 Gbps and lower signal are transmitted as PAM2 signals.

In one embodiment, the mapped data has 65 bits of data along with 22 bits for OAM and reserved bits. This method of operation may further comprise performing time domain duplexing bursting with an ASA compatible PCS. This method of operation may occur in a communication system configured to operate in symmetrical mode or asymmetrical mode based on TDD within an Ethernet compatible network. In one embodiment, the data line rates in asymmetrical mode comprise: 2.5 Gbps downstream and 100 Mbps upstream; 5 Gbps downstream and 100 Mbps upstream; 10 Gbps downstream and 100 Mbps upstream; and 10 Gbps downstream and 1 Gbps upstream.

It is further contemplated that the number of blocks in the mapped data, created by the burst mapper, may be varied to change the effective line rate. At one data rate, namely 10.000 Gbps data rate from a MAC, the XGMII rate is 10.105 Gbps and the transmit line rate is 16 Gbps.

An Ethernet PHY device comprising a time domain duplexing PCS and a PMA. The PCS comprises XGMII encoder configured to receive first data, over an XGMII interface, wherein the first data comprises 64 bits of payload and 4 bits of control per 32 bits of payload, and encode the first data to create second data using XGMII encoding. The device also includes a burst mapper configured to receive the second data and generate mapped data, the mapped data comprising 26 blocks of data, each having 65 bits along with 22 bits for OAM and reserved bits. A framer is configured to process the mapped data with Reed Solomon FEC framing and perform scrambling to create data bursts, that include a header and one or more phyL blocks. a PAM2/PAM4 mapping module is provided and is configured to perform pulse amplitude mapping on the data bursts to create PAM4 signals and PAM2 signals. The PMA is configured to transmit and receive the PAM4 signals and the PAM2 signals over a channel. The PAM4 and PAM2 signals range from 2 Gbps to 16 Gbps, such that 12 Gbps and 16 Gbps signals are transmitted as PAM4 signals and 8 Gbps and lower signal are transmitted as PAM2 signals.

The XGMII encoding may comprise 64b/65b encoding or 64B/66b encoding. In one embodiment, the user selectable data rates comprise the following asymmetrical rates: 2.5 Gbps downstream and 100 Mbps upstream; 5 Gbps downstream and 100 Mbps upstream; 10 Gbps downstream and 100 Mbps upstream; 10 Gbps downstream and 1 Gbps upstream; and the following symmetrical rates: 1 Gbps downstream and 1 Gbps upstream; 2.5 Gbps downstream and 2.5 Gbps upstream; and
5 Gbps downstream and 5 Gbps upstream. This device may further comprise a reconciliation sublayer configured to interface the PHY to a MAC. It is contemplated that the pyhL blocks comprises payload, OAM/reserved allocation, and forward error correction data. In one configuration, each pyhL block comprises 211.25 bytes of payload, 22 bits of OAM/reserved allocation, and 26 bits of forward error correction data.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8 illustrates exemplary PCS structure for 64b/65b coding based on the mapping disclosed herein.

FIG. 9 illustrates a similar data table as shown in FIG. 8, but with reference to 64b/66b coding.

FIG. 11 illustrates an alternative embodiment of the PCS structure for 64b/65b coding that corresponds to the mapping of FIG. 10.

DETAILED DESCRIPTION

The proposed communication protocol enables both asymmetrical and symmetrical communication using a TDD based allocation system, while having Ethernet PHY compatibility for interface with other systems. This results in a system that has several benefits over prior art implementations, including lower power use and lower cost for a given bandwidth requirement, as well as flexible upstream and downstream data rates. In addition, a smaller die size leads to more dies per wafer. In addition, a higher SNR with a lower bit error rate is realized.

Figure 1:
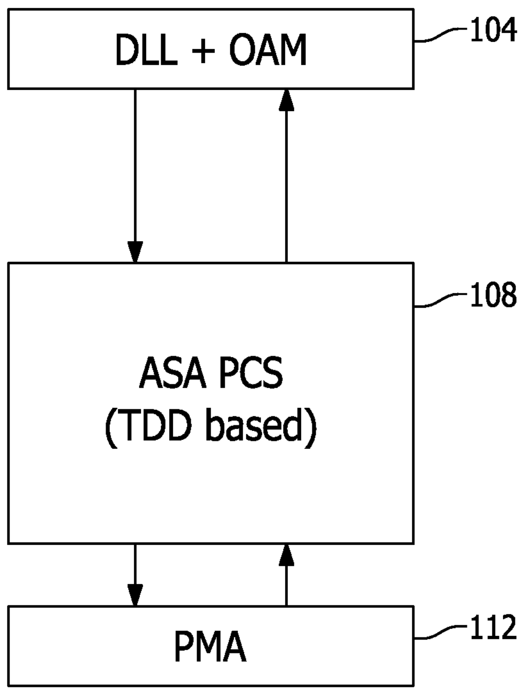
FIG. 1 Prior Art
FIG. 1 illustrates an exemplary communication protocol TDD proposed by ASA (automotive SerDes Alliance).
Figure 2:
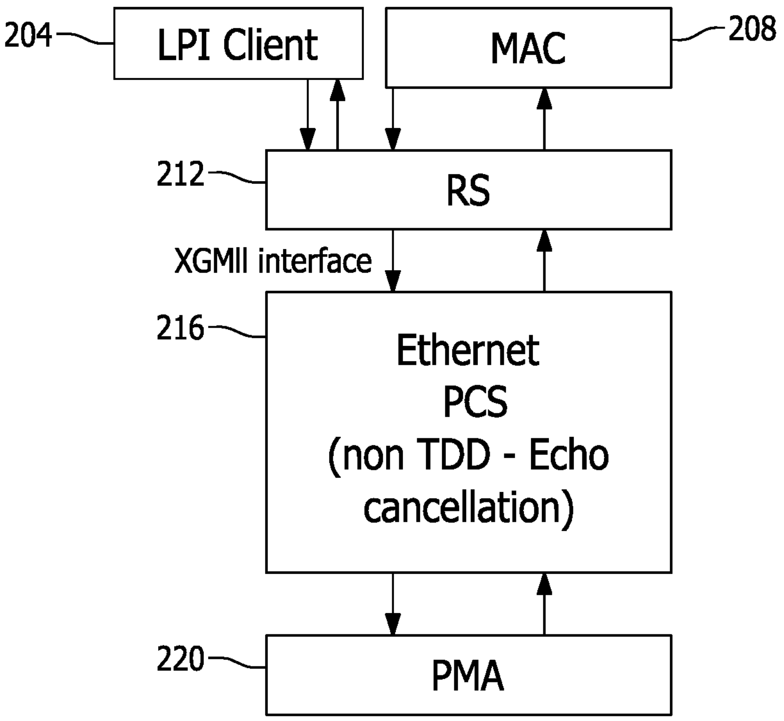
FIG. 2 Prior Art
FIG. 2 illustrates a communication protocol based on Ethernet protocol.
Figures 3, 4:
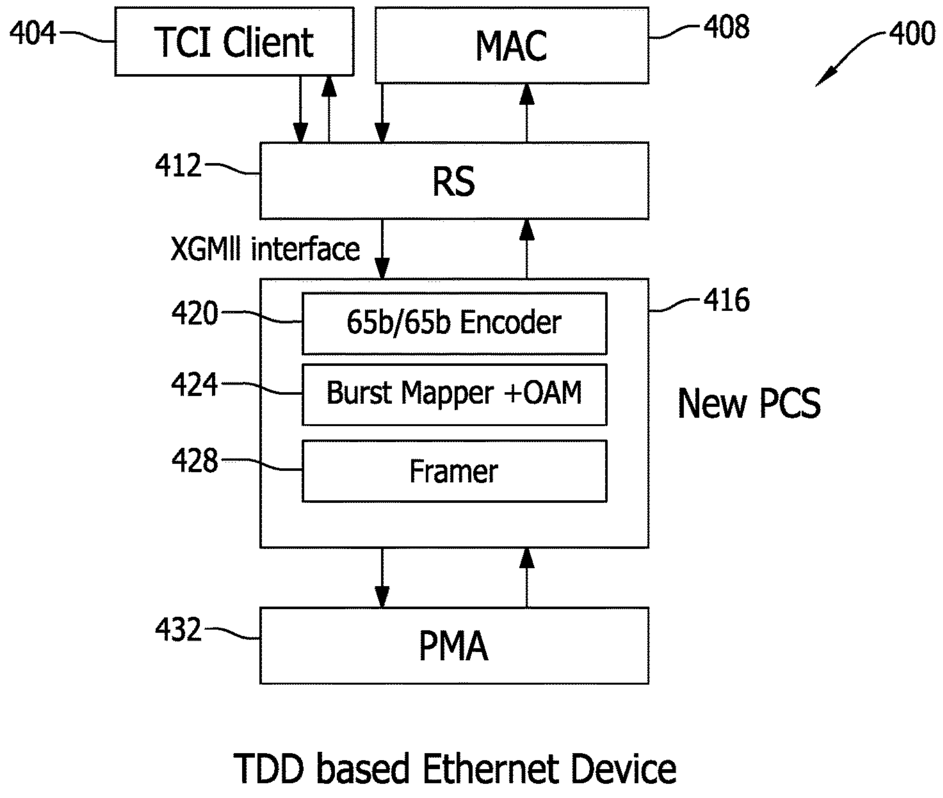
FIG. 3 illustrates a table of exemplary data rates for the Ethernet PHY disclosed herein.
FIG. 4 illustrates an example embodiment of a TDD based Ethernet device that enables seamless interface with the RS layer and MAC layer of Ethernet devices and providing user selectable asymmetric and symmetric data rates.

FIG. 3 illustrates a table of exemplary data rates for the Ethernet PHY disclosed herein. These data rates are exemplary and in other embodiment, other data rates are possible. The data rate is determined by the system implementor based on the amount of traffic to be sent over the channel. For example, for an 8 megapixel camera, approximately 5 Gbps of bandwidth (data rate) is needed. Hence, the system would be configured during network setup to operate in 5 Gbps mode of operation.

As shown in FIG. 3, during asymmetrical operation, the downstream/upstream payload rate can be selected at the following rates: 10G/1G, 10G/100M, 5G/100M, and 2.5G/100M. During symmetrical operation the downstream/upstream payload rate can be set to 5G/5G, 2.5G/2.5G, and 1G/1G. This provides flexibility for network architects and system engineers to select the optimal rate for the specification application. This provides the benefit of being able to use Ethernet as the network protocol while having both asymmetrical and symmetrical data rates, and lower power use, smaller die size, higher signal to noise ratio SNR, better bit error rate (BER), and lower cost attributes of the TDD PHY technology. The following acronyms used in this document are defined as follows: PCS=Physical Coding Sublayer, PMA=Physical Medium Attachment, RS=Reconciliation Sublayer, MAC=Medium Access Control, LPI=Low Power Idle, DLL=Data Link Layer, and ASA=Automotive SerDes Alliance FIG. 4 illustrates an example embodiment of a TDD based Ethernet device that enables seamless interface with the RS layer and MAC layer of Ethernet devices and providing user selectable asymmetric and symmetric data rates. In this embodiment, a TCI client 404 interfaces with the RS layer 412. The TCI client performs or oversees the time domain duplexing control for transmit timing. The TCI client is discussed in detail in U.S. patent application Ser. No. 17/507,632 filed on Oct. 21, 2021, entitled Method and Apparatus for Asymmetrical Communication, and is incorporated in its entirety herein.

Also interfacing with the reconciliation sub-layer (RS) 412 is a MAC layer 408. The MAC layer is known by one of ordinary skill in the art, and as such it is not discussed in detail herein. The RS sublayer 412 is configured to provide a mapping between the signals available at XGMII sublayer and MAC layer. The RS sublayer 412 controls the flow of data from the MAC layer to the PHY layer upon indication from TCI client. For example, when the TCI client decides to temporarily stop the MAC layer 408 data from being sent on the wire, the RS sublayer prevents the MAC from transmitting by de-asserting the "carrier" signal. This is described in detail in U.S. patent application Ser. No. 17/507,632 filed on Oct. 21, 2021, titled Method and Apparatus for Asymmetrical Communication, which is incorporated in its entirety herein.

The RS sublayer communicates over the XGMII interface with an improved physical coding sublayer (PCS) 416. The PCS 416 is a networking protocol sublayer that is a part of the physical layer (PHY), and provides an interface between the Physical Medium Attachment (PMA) sublayer 432 and the media independent interface, such as the XGMII. It is responsible for data encoding and decoding, scrambling and descrambling, alignment marker insertion and removal, block and symbol redistribution, and lane block synchronization. The PMA sublayer 432 is known in the art and not described herein in detail. For the PMA rates of 12 Gbps and 16 Gbps, the PMA is operated in PAM4 mode and for 8 Gbps and other lower rates, the PMA is operated in PAM2 mode.

In this embodiment, the PCS 416 includes a 65b/65b encoder 420, a burst mapper with OAM 424, and an ASA PCS 428 with TDD functionality. This maintains Ethernet compatibility characteristics while also enabling the asymmetrical and symmetrical data rates using TDD as shown in FIG. 3. The PCS elements and functionality is discussed in more detail in FIG. 5.

Figure 5:
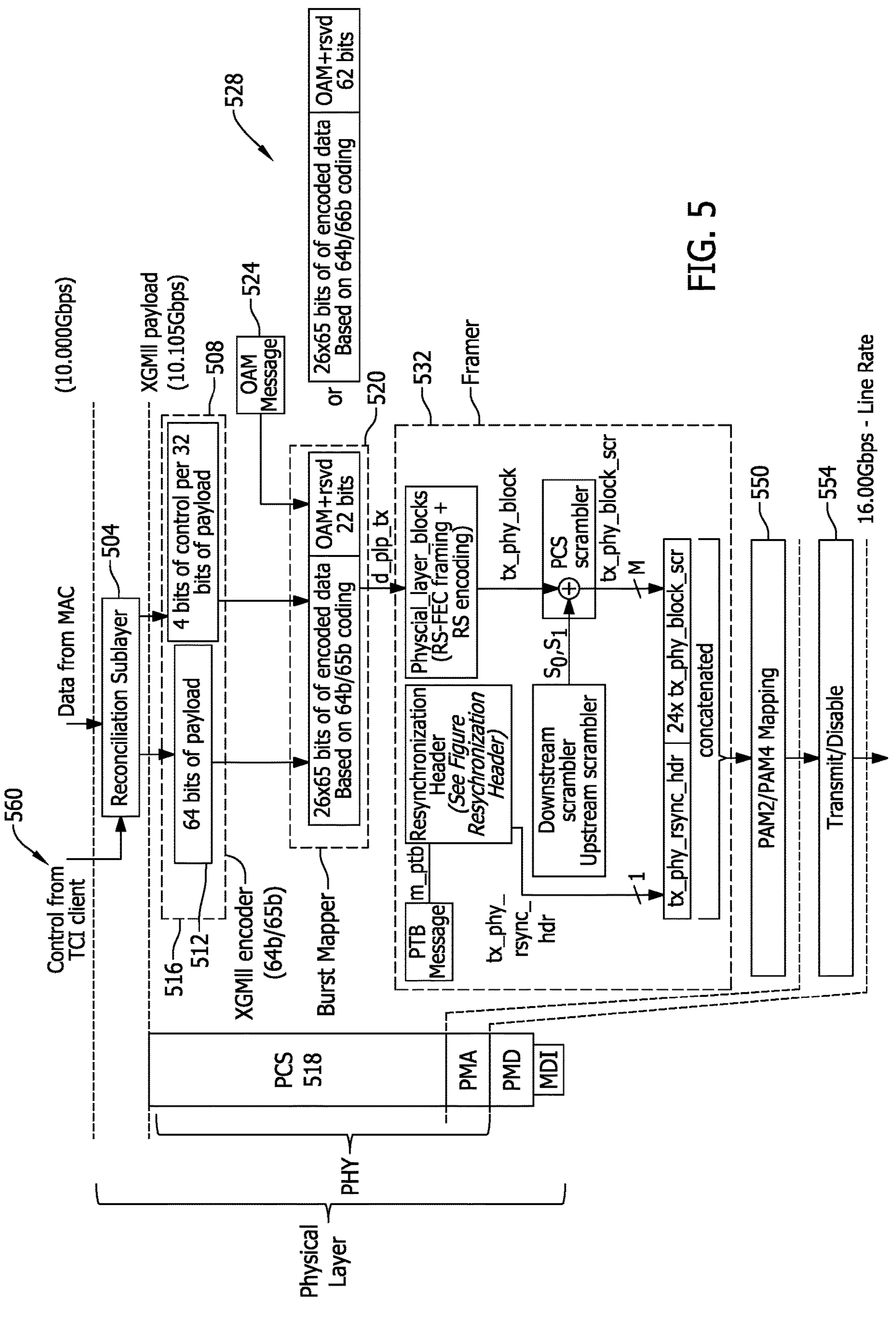
FIG. 5 illustrates an exemplary PHY configuration and function to be used when mapping bits to achieve the payload rates shown in FIG. 3.

FIG. 5 illustrates an exemplary PHY configuration and function to be used when mapping bits to achieve the payload rates shown in FIG. 3. This is one example structure and method for bit mapping. As shown, the incoming data from the MAC is provided at 10.000 Gbps to the RS sublayer 504. For discussion purposes, this embodiment focuses on a 10.000 Gbps stream. For other data rates, the number values of FIG. 5 may change, and those varying values are shown in the data rate tables, such as in FIG. 8. The RS sublayer 504 also receives control input from the TCI client 560. The RS sublayer 504 performs processing on the data from the MAC based on the control input to create XGMII payload at 10.105 Gbps. This processing includes insertion of IDLE characters to increase the data rate from 10.000 Gbps to 10.105 Gbps. The PCS 518 receives the output from the RS sublayer 504 as 64 bits of payload 512 and 4 bits of control signaling 508, per 32 bits of payload, according to the XGMII specification. The XGMII specification is generally understood and as such, is not described in detail beyond the innovation disclosed herein. The combined bit rate with payload and control is 10.105 Gbps.

However, since ASA PCS layer 518 is not natively designed to accept the data in this format and operates at a rate different from XGMII data rate, a mapping circuit is utilized to adapt to this format and to adjust the data rates. For example, XGMII operates at 10/5/2.5 Gbps whereas the ASA PMA operates at 16/12/8/4/2 Gbps. In an embodiment of a PHY operating at the 10 Gbps XGMII data rate, 26 blocks of 64 bits each is received by the new PCS 518. Each block of 64 bits is encoded into a 65 bit block by a 64b/65b encoder circuit according to IEEE defined 64b/65b coding mechanism. Such encoding uses 4 bits of control data that is sent by the RS sublayer 504 to the PHY with every 32 bits of payload data.

The output of the xMii encoder is provided to a burst mapper 520. The burst mapper 520 maps the bits to 26 blocks each having 65 bits of encoded data based on 64b/65b coding by combining the payload 512 and the control bits 508. The burst mapper 520 also receives OAM message 524 which is appended to the data with reserved bits such that in this embodiment the OAM and reserved bits are allocated 22 bits. The OAM bit allocation is provided for, but it does not have to be utilized. The resulting burst is provided to the ASA PCS 532. Alternatively, as shown in burst 528, the burst could comprise 25×66 bits of encoded data based on 64b/66b coding and 62 bits allocated for OAM and reserved bits.

In particular, the mapper circuit concatenates 26 blocks of 65 bits and appends 22 bits of OAM data+reserved bits at the end of the block of 26×65, which is equal to 1690 bits.

Within the ASA PCS layer 532, additional processing occurs to further format the 214 bytes of data into blocks of 240 bytes. This additional processing includes the assembly of data into physical layer blocks comprising Reed-Solomon Forward Error Correction (RS-FEC) framing plus Reed-Solomon (RS) encoding. This encoding of the data is performed for the purpose of error correction and error detection and generates the tx_phy_block of 240 bytes. The resulting block, referred to a tx_phy_block is provided to a PCS scrambler which also receives scrambler codes for downstream and upstream scrambling. The 240 bytes are then scrambled. This ASA PCS layer 532 differs from prior art ASA PCS layers in configuration and operation. For example, as discussed above, the prior art ASA utilizes tx_phy_blocks containing 720 bytes while in the structure disclosed herein such that the tx_phy_block contains 240 bytes. In addition, the system structure is also different, in the prior art, Reed Solomon (RS) FEC uses 642 bytes which are processed to generate the 720 bytes. Disclosed herein is a structure that uses RS FEC of 214 bytes which are processed into the tx_phy_block of 240 bytes.

Figure 6:
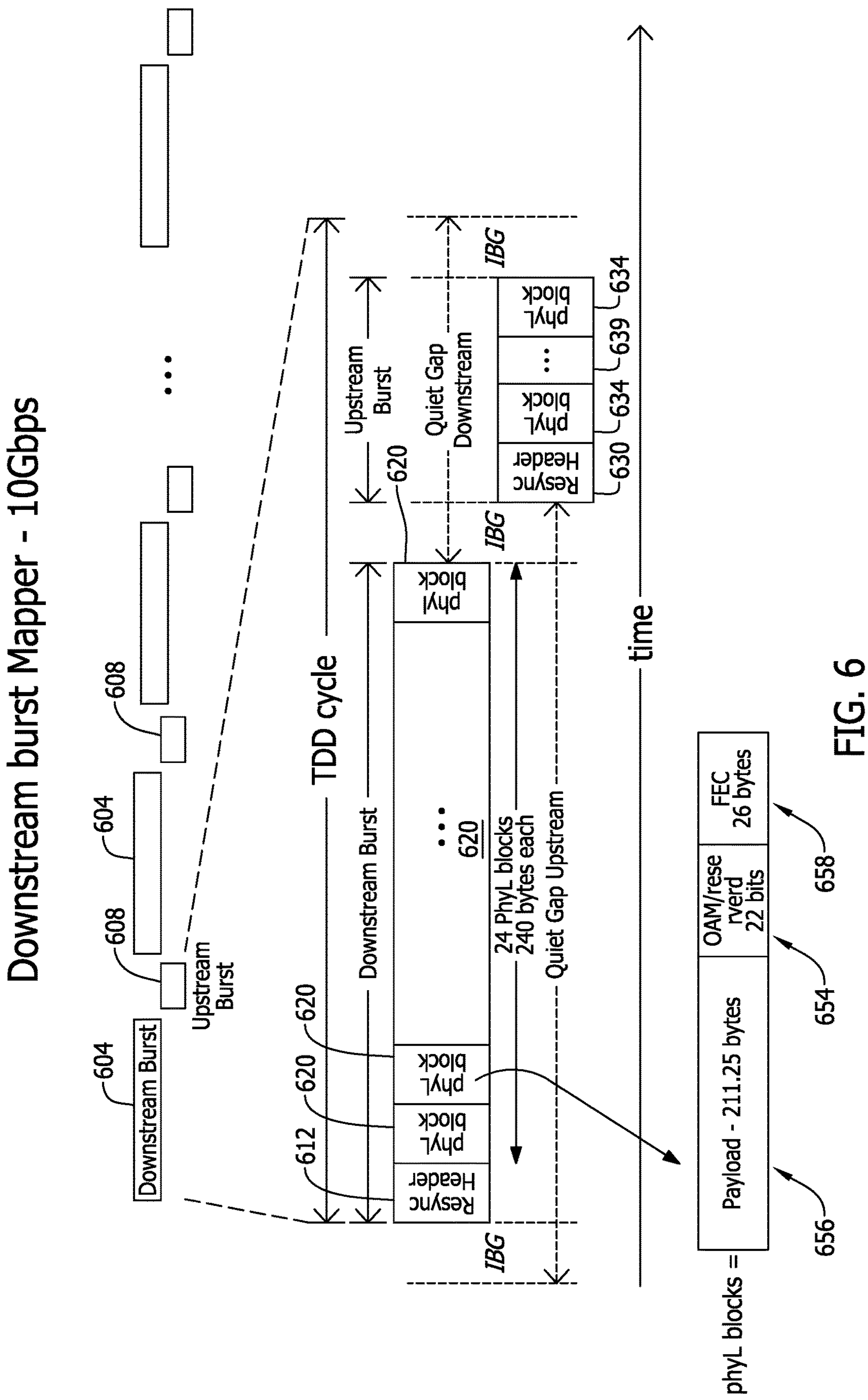
FIG. 6 illustrates a downstream burst as implemented by the downstream burst mapper.

Concurrently, the ASA PCS 532 assembles a resynchronization header using a PTB message to output a tx_phy_rsync_hdr, which is to say, the 240 byte long PHY blocks are grouped into a burst containing 24 phyL blocks with 240 bytes each. After this, the resync header is added. The resulting downstream burst is shown in FIG. 6. The tx_phy_rsync_hdr and the output from the scrambler to generate concatenated block with header, which is output to a PAM2/PAM4 mapper 550.

For each TDD cycle, downstream PCS sends 24 blocks of 240 bytes encoded as PAM4 symbols to the PMA sublayer at 8 Gigasymbols/sec (16 Gbps). The PAM2/PAM4 mapper 550 performs the designated type of mapping on the data and provides the mapper data to a transmit block 554 which selectively transmits the resulting waveform, based on an enable/disable signal, on the transmission medium. The line rate from the transmit block 554 is 16.000 Gbps. The resync header is sent as PAM2 symbols.

Figure 12:
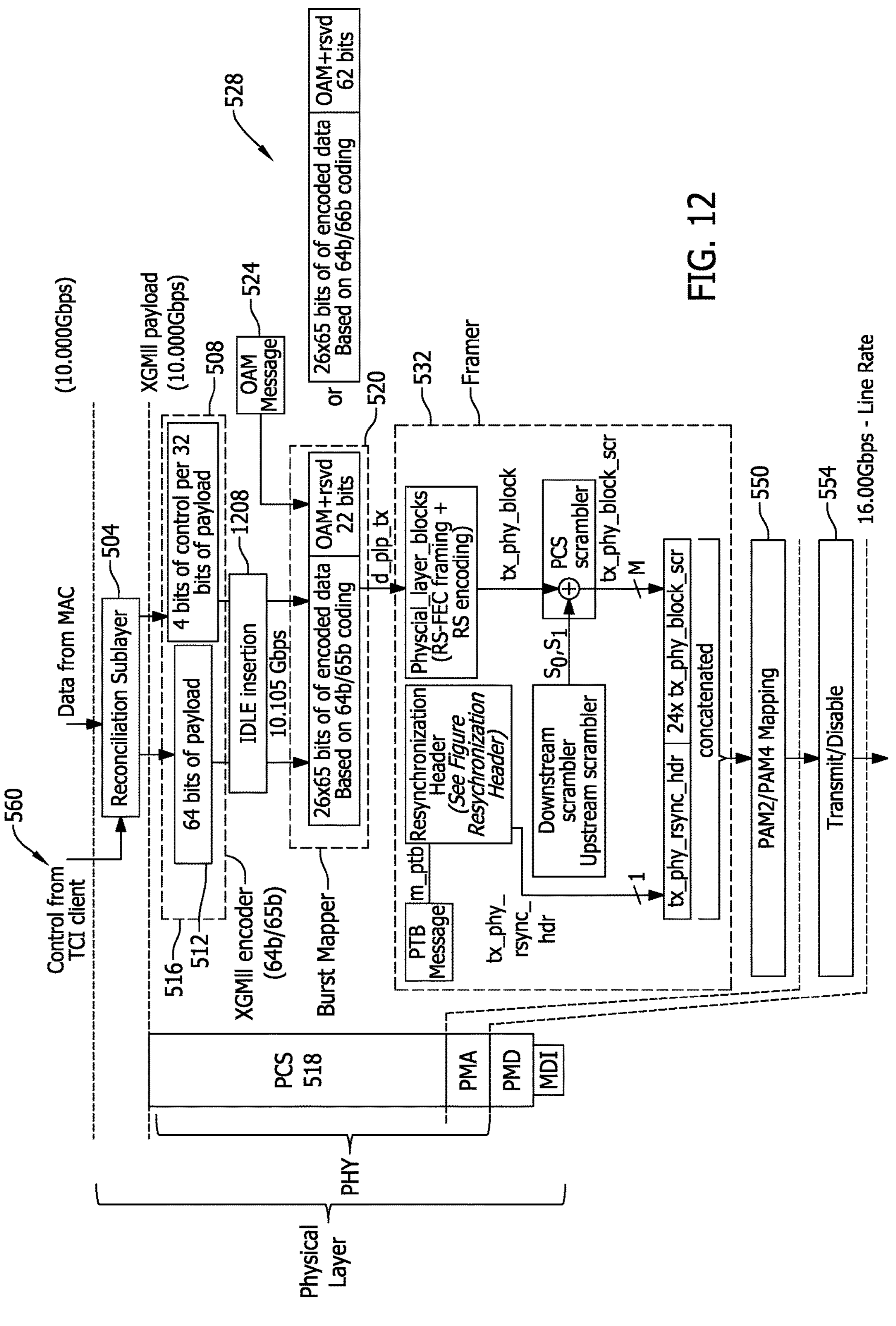
FIG. 12 illustrates an exemplary PHY configured with the PCS performing idle symbol insertions.

In this example embodiment, the resulting data rate is 10.105 Gbps per second at the PHY level. However, since the MAC/PLS interface, under the IEEE standard, operates at a nominal rate of up to 10.000 Gbps, the difference between rates is reconciled by the RS sub layer 504 along with the TCI Idle client as described earlier. The client input 560 to the RS sublayer 504 controls the RS sublayer such that the RS sublayer prevents the MAC from sending more than 10.000 Gbps of data to the PHY. Since, the PHY has some excess bandwidth, it sends idle symbols on the physical medium when the MAC is not sending data to the PHY. In one embodiment, idle symbols can be sent by the PCS (instead of RS) resulting in XGMII rate of 10.000 Gbps instead of 10.105 Gbps. This is illustrated in FIG. 12 which is discussed below.

FIG. 6 illustrates a downstream burst as implemented by the downstream burst mapper in 10 Gbps asymmetrical mode. The top section of the diagram shows numerous asymmetrical bursts with downstream bursts 604 allocating a larger transmit window than upstream bursts 608. The content of the downstream bursts 604 and upstream bursts 608 is provided in more detail in expanded format. One downstream burst and one upstream burst form a TDD cycle. During the downstream burst 604, there is a quiet gap upstream and likewise, during the upstream burst 608, there is a quiet gap downstream.

The downstream burst 604 comprises a resync header 612 and number of phyL blocks 620. A phyL block 620 is a combination of payload 650, OAM/reserved bit allocation 654, and FEC bits 658. In this embodiment, the downstream burst 604 includes 24 phyL blocks with each block being 240 bytes. Each phyL block contains 211.25 bytes of payload 650, 22 bits of OAM content or reserved allocation 654, and 26 bytes of forward error correction (FEC) content 658. It is contemplated that future embodiment may include a MUX header.

The upstream burst 608 is similarly configured as the downstream burst but provided less transmit time. It comprises an upstream resync header 630 and phyL blocks 634. The content of each phyL block may be the same as in the downstream burst.

Figure 7:
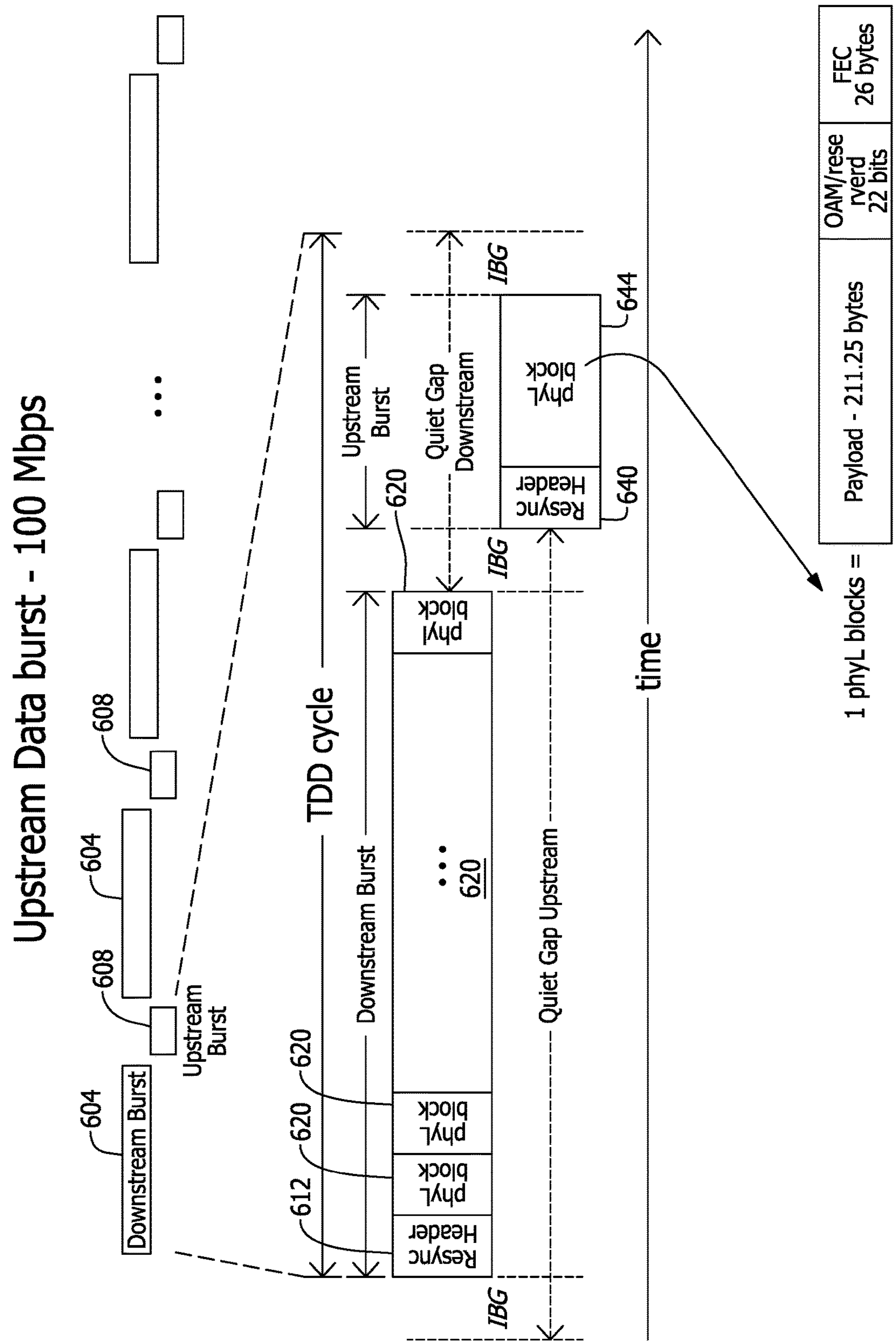
FIG. 7 illustrates an exemplary upstream burst as implemented by the upstream burst mapper.

FIG. 7 illustrates an exemplary upstream burst as implemented by the upstream burst mapper in a 100 Mbps data rate in an asymmetrical mode. As compared to FIG. 6, similar elements are labeled with identical reference numbers. The upstream burst includes a resync header 640 and one or more phyL blocks 644. The upstream burst phyL block 644 comprises a payload of 211.25 bytes, 22 bits for OEM and reserved space and 26 bytes of FEC content.

In operation during upstream transmit mode during TDD based 100 Mbps of the Ethernet PHY. The data received by the RS sublayer is sent to the PCS sublayer of PHY in 32 bit increments along with 4 bits of control signaling based on the XGMII specification. However, since the ASA PCS layer is not natively designed to accept the data in this format and operates at a rate different from XGMII data rate, a mapping circuit adapts to this format and also to adjust the rates. For example, the XGMII interface operates at 10/5/2.5 Gbps, whereas the ASA PMA operates at 16/12/8/4/2 Gbps.

In one embodiment of a PHY operating at a 100 Mbps XGMII data rate, blocks of 64 bits each, are received by the improved PCS disclosed herein. Each block of 64 bits is encoded into a 65 bit block by a 64b/65b encoder circuit according to IEEE defined 64b/65b coding mechanism. Such encoding uses 4 bits of control data that is sent by the RS sublayer to the PHY with every 32 bits of payload data.

The mapper circuit concatenates 26 blocks of 65 bits and appends 22 bits of OAM data+reserved bits at the end of the block of the 1690 bits (26 blocks×65 bits equals 1690 bits). The resulting block of 1712 bits (214 bytes) is then fed to a Reed Solomon encoder which generates a PHY block of 240 bytes. The resulting 240 bytes are then scrambled. The scrambled 240 byte long PHY blocks form a burst containing 1 phyL block containing 240 bytes. After this, the resync header is added. The resulting upstream burst is as shown in FIG. 7.

For each TDD cycle, the upstream PCS sends 1 phyL block of 240 bytes encoded as PAM2 symbols to the PMA sublayer at 2 G symbols/sec (4 Gbps) which in turn sends the resulting waveform on the transmission medium. The resync header is sent as PAM2 symbols. The resulting data rate is 421 Mbps per second at the PHY level. However, since it is desired to operate the MAC/PLS interface at a standard Ethernet rate such as 100 Mbps, the difference between rates is reconciled by the RS sublayer along with the TCI Idle client. The client controls the RS sublayer such that the RS sublayer prevents the MAC from sending more than 100 Mbps of data to the PHY. Because, the RS sublayer has excess bandwidth, it sends IDLE symbols on the physical medium when the MAC is not sending data to the PHY. In one embodiment, the IDLE symbols can be sent by the PCS (instead of the RS sublayer).

FIG. 8 illustrates exemplary PCS structure for 64b/65b coding based on the mapping disclosed herein. Other mapping schemes are possible. By varying the blocks or the number of bytes/bits per block, the data rate is controllable, such as adjusting the number blocks of data per data burst or the bytes/bits per block. Column 804 designates the mode of operation, namely symmetrical or asymmetrical. Column 808 defines the downstream line speed, which is the PMA rate. Columns 810 is the allocated FEC blocks and bytes per allocated block, which is one block of 26 bytes. Columns 812 defined the amount of OAM and reserved bytes, which is 22 bits total. Column 816 is the total PHY payload, which is 211.25 bytes, while column 820 defines the total bytes per block. In this embodiment, there are 214 bytes per block. Column 824 defines the total PHY frame size, which is 240 bytes for all downstream rates.

The upstream line speed in Gbps is shown in column 828. As can be seen, for the symmetric line rates, the downstream rate matches the upstream rate, while for the asymmetrical line rates, the upstream rate differs from the downstream rate. Columns 832, 836, 840, 844 and 848 are generally the same as columns 810, 812, 816, 820 and 824. Columns 852, 856 define the downstream burst count and downstream burst time respectively. Similarly, columns 858, 860 define the downstream burst count and downstream burst time respectively. As can be seen, the asymmetrical burst count in blocks and the allocated time varies between the downstream and upstream directions.

Column 862 represents the downstream 64b data rate while column 864 represents the upstream 64b data rate, both in Gbps. In the case of asymmetrical mode with a 16/4 PMA rate, the data rate is actually 10.105 Gbps and 0.421 Gbps, which includes OAM. To reach the desired line rates, shown in column 890, idle symbols are added to the data stream to reduce the effective data transfer rate to the 10G/100M rate. This rate of 10G/100M complies with one of Ethernet's traditional data rates, which are traditionally 1M, 10M, 100M, 1G, and 10G.

Varying the burst count values shown in column 852, controls the data rate. For example, for the exemplary 10 Gbps/100 Mbps line data rate, the block count in the downstream direction is 24 phyL blocks per burst, while the block count in the upstream direction is 1 phyL block per burst. In addition, varying the PMA (physical medium attachment) line rate will also affect the data rate. The excess data rate available as shown in column 862 is filled with idle symbols to arrive at the Ethernet compatible line rate shown in column 890.

FIG. 9 illustrates a similar data table as shown in FIG. 8, but with reference to 64b/66b coding. Only the aspects that differ from FIG. 8 are discussed in connection with FIG. 9. As compared to the 65b/65b coding of FIG. 8, columns 908 are modified to provide a different number of reserved bits. Similarly, the PHY payload rate, shown at column 912 is set to 206.25 bytes in the downstream direction. As shown, there are 62 bits for the OAM and reserved bits. Turning to the upstream direction, column 916 match column 908 and column 920 matches column 912.

Using 64b/66b coding also changes the downstream burst count (in blocks) and the downstream burst time as compared to 64b/65b coding as is shown in column 928. As a result of the mapping disclosed herein, the downstream data rate is for the exemplary 10G/100M set to 10.108 Gbps, as shown in column 932, and the upstream data rate is 0.361, as shown in column 936 is for the exemplary 10G/100M data rate. Columns 940, 944 represent the data rates without OAM.

Figure 10:
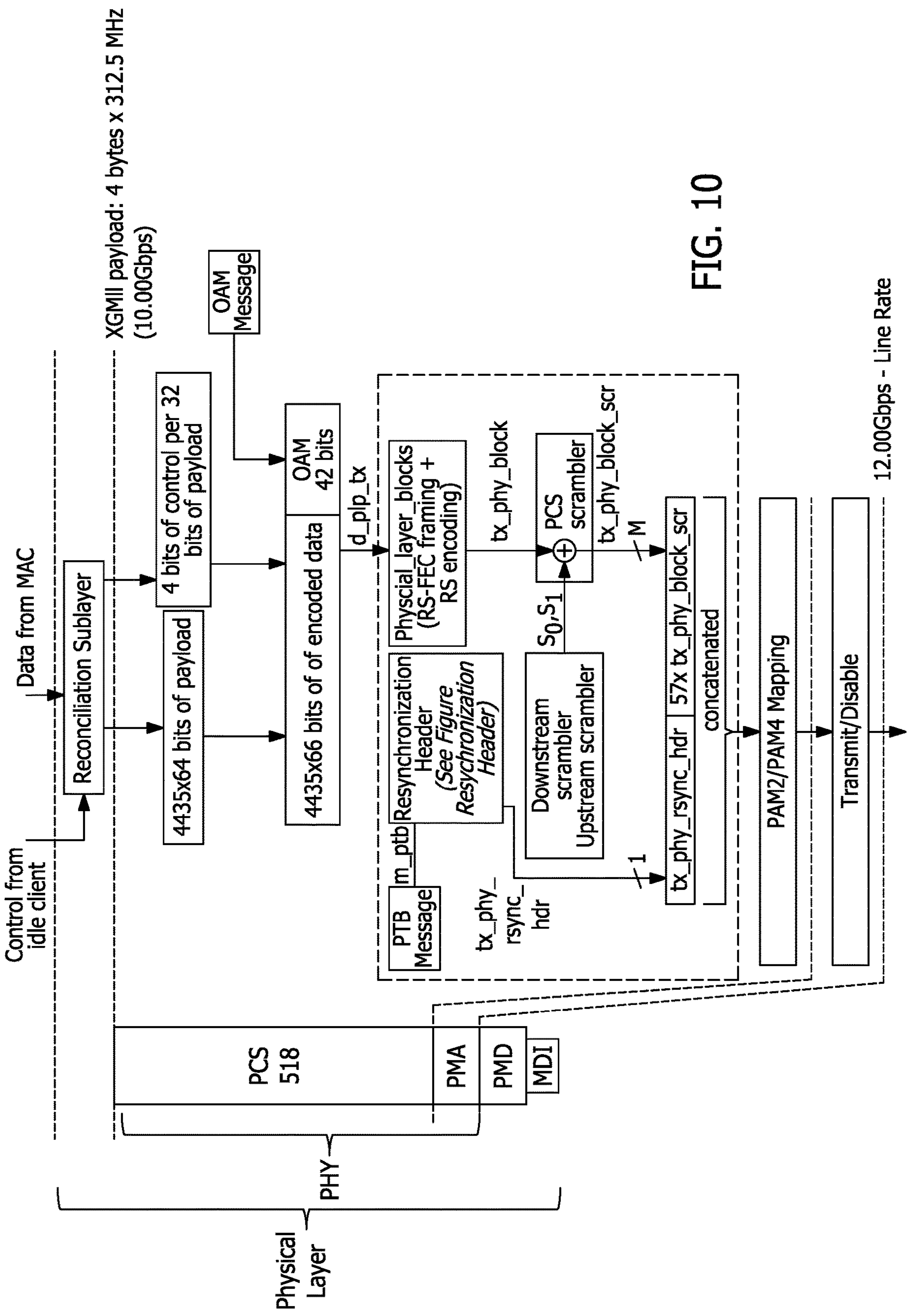
FIG. 10 illustrates an alternative embodiment of a PHY configuration as compared to that shown in FIG. 5.

FIG. 10 illustrates an alternative embodiment of a PHY configuration as compared to that shown in FIG. 5. This alternative embodiment is similar in function but differs in the mapping performed. For example, this embodiment changes the bit mapping, resulting in a 12.00 Gbps line rate and adjusts the number of OAM bits in the burst mappers. The XGMII payload also differs at 10.00 Gbps instead of the 10.105 Gbps as show in the embodiment of FIG. 5. As a result, it is contemplated that alternative methods of mapping bits are possible to provide for a TDD based, Ethernet compatible system capable of both symmetrical and asymmetrical operation.

FIG. 11 illustrates an alternative embodiment of the PCS structure for 64b/65b coding that corresponds to the mapping of FIG. 10. This table explains and supports the disclosure of the alternative embodiments.

FIG. 12 illustrates an exemplary PHY configured with the PCS performing idle symbol insertion. As compared to FIG. 5, identical elements are labeled with identical reference numbers. This configuration provides XGMII rate of 10.00 Gbps which is an established rate. In reference to FIG. 12, the PCS includes an idle insertion block 1208 that is configured to insert idle symbols to change the data rate of 10.000 Gbps to outputted rates of 10.105 Gbps. This configuration has the benefit of being able to operate the XGMII interface at the traditional speed of 10.000 Gbps as opposed to a non-traditional speed of 10.105 Gbps. This facilitates seamless interface with existing 10 Gbps Ethernet MACs which operate at 10.000 Gbps only and are not able to operate at 10.105 Gbps.

Figure 13:
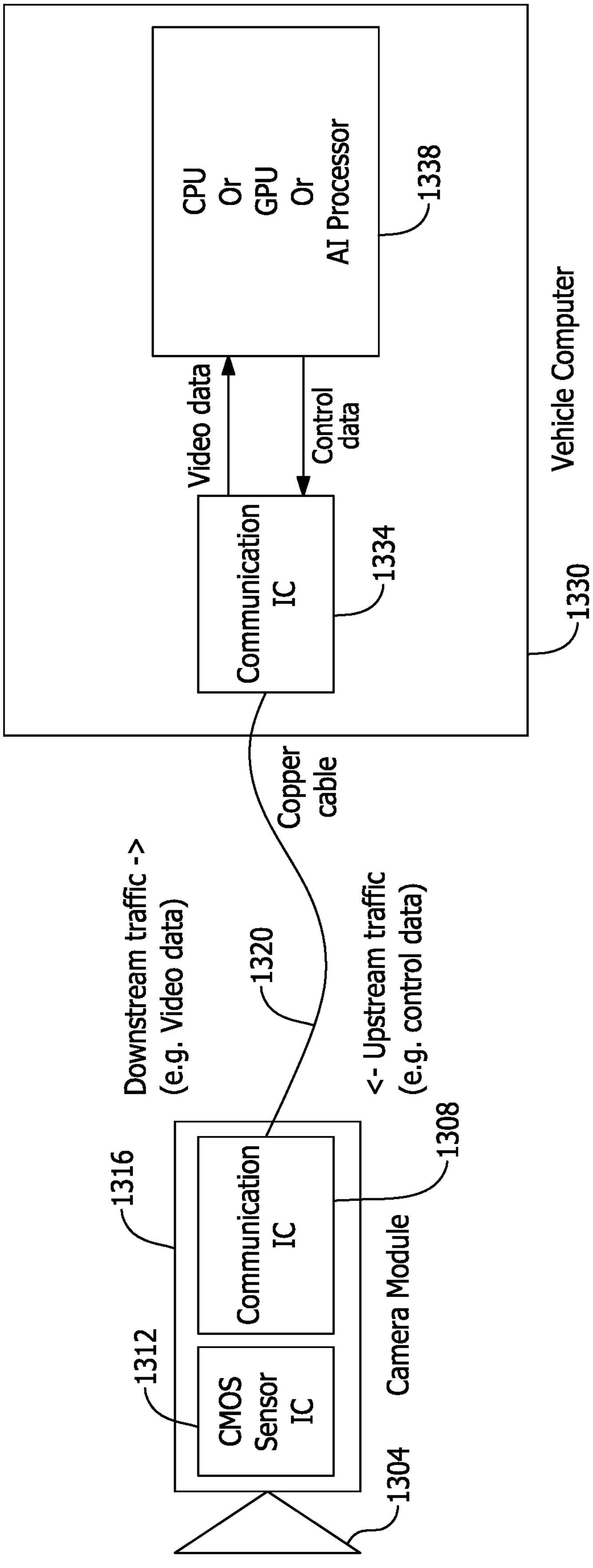
FIG. 13 illustrates an example environment of use.

FIG. 13 illustrates an example environment of use. This is but one possible environment of use and the method and apparatus disclosed herein may find use in other applications. This example environment is an automotive network environment that includes network communications between sensor and other automotive systems, such as a CPU, GPU, AI processor, remote communication systems, or to driver interfaces or other automobiles. Any type sensor is contemplated that is in use now or adopted for use in the future, such as but not limited to image sensors, radar, or any type of sensor or detector.

In this exemplary environment of use, a camera lens system 1304 that directs an image to a sensor 1312, such as a CMOS image sensor that is part of a camera module 1312. The image data from the sensor 1312 is provided to a communication circuit 1308 that handles data input and output from the camera module 1316 over a network.

The communication circuit connects to or communicates over a channel 1320, which may be any type channel including fiber optics, conductive metal, such as copper, wireless communications, or a combination of these channel types. As such, downstream traffic, such as video data, is provided from the camera module 1316 to a vehicle computer 1330.

At the vehicle computer, a communication circuit 1334 functions similarly to the communication circuit 1308 in the camera module 1316. The communication circuit 1334 interfaces with the processor 1338, which may be the CPU, GPU, AI processor or any other device or element that received the data from the sensor and provides control data back to the sensor 1316 in the upstream direction. The control data may be any type data which controls the sensor 1316. As such, the input to the processor 1338 from the communication circuit is the video data, while the control data is sent from the processor to the communication circuit.

As is understood in the art, the communication circuits 1308, 1334 include number elements which establish communication over the channel 1320. This may include but is not limited to amplifiers, filters, memory, transformers, processors, ASICS, DSP, equalizers, slicers, error corrections systems, modulators, demodulators, and other elements which enable network communication.

Also incorporated by reference herein, in their entirety, are the following references 1) U.S. Provisional Patent Application No. 63/253,044 filed on Oct. 6, 2021, entitled A TDD Based Multi-Gigabit Ethernet Physical Layer Device and 2) U.S. Provisional Patent Application No. 63/293,572 filed on Dec. 23, 2021, entitled A TDD Based Symmetrical Ethernet Physical Layer Device.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A physical layer Ethernet device, utilizing time domain duplexing, capable of symmetrical or asymmetrical communication, comprising:

a time domain duplexing physical coding sublayer (PCS) comprising:

XGMII encoder configured to:

receive first data, over an XGMII interface;

encode the first data to create second data using XGMII encoding;

a downstream burst mapper configured to receive the second data and generate mapped data, the mapped data comprising blocks of data, operations administration and maintenance (OAM) data, and reserved bits;

a framer configured to process the mapped data with Reed Solomon FEC framing and perform scrambling to create downstream data bursts, that include a header and one or more phyL blocks;

a mapping module configured to performing pulse amplitude mapping on the downstream data bursts to create downstream PAM2 and PAM4 mapped signals, wherein the mapping module is further configured to perform pulse amplitude mapping on upstream data bursts to create upstream PAM2 and PAM4 mapped signals, which upstream and downstream data bursts do not overlap in time; and a PMA configured to transmit and receive the PAM4 signals and the PAM2 signals over a channel, ranging from 2 Gbps to 16 Gbps the PAM4 signals and the PAM2 signals comprising the upstream mapped signals and the downstream mapped signals.

2. The device of claim 1 wherein the first data comprises 64 bits of payload and 4 bits of control per 32 bits of payload.

3. The device of claim 1 wherein the XGMII encoding comprises 64b/65b encoding or 64B/66b encoding.

4. The device of claim 1 wherein the mapped data comprising 26 blocks of data, each having 65 bits along with 22 bits for OAM and reserved bits.

5. The device of claim 1 wherein the mapped signal comprise PAM2 signal, PAM4 signals, or both, such that 12 Gbps and 16 Gbps signals are transmitted as PAM4 signals and 8 Gbps and lower signal are transmitted as PAM2 signals.

6. The device of claim 1 wherein each phyL block comprises 240 bytes.

7. The device of claim 1 further comprising incorporating idle symbols, prior to burst mapping, to reduce the effective data rate.

8. The device of claim 1 wherein the data rates in asymmetrical mode comprise:

2.5 Gbps and 100 Mbps;

5 Gbps and 100 Mbps;

10 Gbps and 100 Mbps; and

10 Gbps and 1 Gbps.

9. A method, utilizing time domain duplexing, capable of symmetrical or asymmetrical communication, performed by a physical layer device, comprising:

performing XGMII encoding on first data, received over an XGMII interface, wherein the first data comprises 64 bits of payload and 4 bits of control per 32 bits of payload, to create second data;

mapping the second data with a downstream burst mapper to generate mapped data;

framing the mapped data with Reed Solomon FEC framing and performing scrambling to create downstream data bursts, the downstream data bursts including a header and one or more phyL blocks;

performing PAM2/PAM4 mapping on the downstream data bursts to create PAM4 signals and PAM2 signals, wherein the mapping module is further configured to perform pulse amplitude mapping on upstream data bursts to create upstream PAM2 and PAM4 mapped signals, which upstream and downstream data bursts do not overlap in time; and transmitting and receiving the PAM4 signals and the PAM2 signals, ranging from 2 Gbps to 16 Gbps, such that 12 Gbps and 16 Gbps signals are transmitted as PAM4 signals and 8 Gbps and lower signal are transmitted as PAM2 signals, the PAM4 signals and the PAM2 signals comprising the upstream mapped signals and the downstream mapped signals.

10. The method of claim 9 wherein the mapped data comprises 65 bits of data along with 22 bits for OAM and reserved bits.

11. The method of claim 9 further comprising performing time domain duplexing bursting with an ASA compatible PCS.

12. The method of claim 9 wherein the method occurs in a communication system configured to operate in symmetrical mode or asymmetrical mode based on TDD within an Ethernet compatible network.

13. The method of claim 12 wherein the data line rates in asymmetrical mode comprise:

2.5 Gbps downstream and 100 Mbps upstream; 5 Gbps downstream and 100 Mbps upstream;

10 Gbps downstream and 100 Mbps upstream; and 10 Gbps downstream and 1 Gbps upstream.

14. The method of claim 9 wherein the number of blocks in the mapped data, created by the burst mapper, is varied to change the effective line rate.

15. The method of claim 9 wherein in the case of 10.000 Gbps data rate from a MAC, the XGMII rate is 10.105 Gbps and the transmit line rate is 16 Gbps.

16. An Ethernet PHY device comprising:

a time domain duplexing PCS comprising:

XGMII encoder configured to:

receive first data, over an XGMII interface, wherein the first data comprises 64 bits of payload and 4 bits of control per 32 bits of payload;

encode the first data to create second data using XGMII encoding;

a downstream burst mapper configured to receive the second data and generate mapped data, the mapped data comprising 26 blocks of data, each having 65 bits along with 22 bits for OAM and reserved bits;

a framer configured to process the mapped data with Reed Solomon FEC framing and perform scrambling to create downstream data bursts, that include a header and one or more phyL blocks;

a PAM2/PAM4 mapping module configured to performing pulse amplitude mapping on the downstream data bursts to create downstream PAM4 signals and PAM2 signals, wherein the mapping module is further configured to perform pulse amplitude mapping on upstream data bursts to create upstream PAM2 and PAM4 mapped signals, which upstream and downstream data bursts do not overlap in time; and a PMA configured to transmit and receive the PAM4 signals and the PAM2 signals over a channel, ranging from 2 Gbps to 16 Gbps, such that 12 Gbps and 16 Gbps signals are transmitted as PAM4 signals and 8 Gbps and lower signal are transmitted as PAM2 signals, the PAM4 signals and the PAM2 signals comprising the upstream mapped signals and the downstream mapped signals.

17. The device of claim 16 wherein the XGMII encoding comprises 64b/65b encoding or 64B/66b encoding.

18. The device of claim 16 wherein the user selectable data rates comprise:

the following asymmetrical rates:

2.5 Gbps downstream and 100 Mbps upstream;

5 Gbps downstream and 100 Mbps upstream;

10 Gbps downstream and 100 Mbps upstream;

10 Gbps downstream and 1 Gbps upstream;

and the following symmetrical rates:

1 Gbps downstream and 1 Gbps upstream;

2.5 Gbps downstream and 2.5 Gbps upstream; and

5 Gbps downstream and 5 Gbps upstream.

19. The device of claim 16 further comprising a reconciliation sublayer configured to interface the PHY to a MAC.

20. The device of claim 16 wherein the phyL blocks comprises payload, OAM/reserved allocation, and forward error correction data.

21. The device of claim 20 wherein each phyL block comprises 211.25 bytes of payload, 22 bits of OAM/reserved allocation, and 26 bits of forward error correction data.

22. The device of claim 1, wherein the downstream data burst comprises a quiet gap downstream and the upstream data burst comprises a quiet gap downstream, such that the downstream data burst is transmitted during the quiet gap upstream and the upstream data burst is transmitted during the quiet gap downstream.

* * * * *